United States Patent
Sawada (12)

(10) Patent No.: US 10,142,519 B2
(45) Date of Patent: Nov. 27, 2018

(54) IMAGE FORMING APPARATUS AND METHOD FOR CORRECTING READ SIGNAL

(71) Applicant: Konica Minolta, Inc., Chiyoda-ku, Tokyo (JP)

(72) Inventor: Koichi Sawada, Hino (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 48 days.

(21) Appl. No.: 14/945,016

(22) Filed: Nov. 18, 2015

(65) Prior Publication Data

US 2016/0150127 A1 May 26, 2016

(30) Foreign Application Priority Data

Nov. 21, 2014 (JP) .................... 2014-236085

(51) Int. Cl.
*G06F 15/00* (2006.01)
*H04N 1/60* (2006.01)

(52) U.S. Cl.
CPC ......... *H04N 1/6097* (2013.01); *H04N 1/6033* (2013.01)

(58) Field of Classification Search
CPC .................... H04N 1/6097; H04N 1/6033
USPC ........................................ 358/520
See application file for complete search history.

(56) References Cited

U.S. PATENT DOCUMENTS

| | | | | |
|---|---|---|---|---|
| 6,567,543 B1* | 5/2003 | Shiraiwa | ............. | H04N 1/6088 348/E9.052 |
| 8,634,118 B2* | 1/2014 | Okano | .................. | H04N 1/40 347/15 |
| 2010/0296141 A1* | 11/2010 | Maruyama | ......... | H04N 1/02865 358/509 |
| 2011/0122466 A1* | 5/2011 | Tanimura | ........... | H04N 1/00846 358/518 |

(Continued)

FOREIGN PATENT DOCUMENTS

| | | |
|---|---|---|
| CN | 102075659 A | 5/2011 |
| CN | 102172011 A | 8/2011 |
| JP | 6-83364 A | 10/1994 |

OTHER PUBLICATIONS

Chinese Office Action dated Dec. 5, 2017 issued in corresponding Chinese Patent Application 201510788577.8, with English Translation.

(Continued)

*Primary Examiner* — Mark R Milia
(74) *Attorney, Agent, or Firm* — Buchanan Ingersoll & Rooney PC

(57) ABSTRACT

An image forming apparatus, including: a first reading section which emits visible light to a sheet having an image formed thereon, receives light from the sheet and outputs a read signal having an intensity corresponding to an amount of the received light; a second reading section which emits light including at least ultraviolet light to a ground region of the sheet, receives light from the sheet and outputs a read signal having an intensity corresponding to an amount of the received light; and a correction section which corrects the read signal output from the first reading section by using the read signal output from the second reading section so that a color reproduced by the read signal output from the first reading section is consistent with a color observed by a user.

17 Claims, 6 Drawing Sheets

(56) References Cited

U.S. PATENT DOCUMENTS

2011/0149319 A1* 6/2011 Muto .................. H04N 1/6033
  358/1.9
2014/0043626 A1* 2/2014 Teraue ................ G06K 15/027
  358/1.9

OTHER PUBLICATIONS

Chinese Office Action (Notification of the Second Office Action) dated Jun. 6, 2018 issued in corresponding Chinese Patent Application 201510788577.8, with English Translation (16 pages).

* cited by examiner

IMAGE FORMING APPARATUS AND METHOD FOR CORRECTING READ SIGNAL

BACKGROUND OF THE INVENTION

1. Field of the Invention

The present invention relates to an image forming apparatus and a method for correcting a read signal.

2. Description of Related Art

Some image forming apparatuses read reference images in simple colors, mixed colors or such like formed on sheets of paper with reading sections and can calibrate the colors of images to be formed according to the obtained read signals. There are also image forming apparatuses which test the formed images by reading the images formed on the sheets and comparing the images with original images.

Read signals accurately indicating the colors of images on the sheets are necessary in order to perform accurate calibration and such like. However, when fluorescent whitening agent is used for the sheets in order to enhance the whiteness of the sheets, the colors reproduced by the read signals are not consistent with the colors observed by users in some cases.

In natural light, ultraviolet light included in the natural light is absorbed by the fluorescent whitening agent in a sheet, and light (fluorescence) is released. Since the fluorescence is visible light having a wavelength close to that of the ultraviolet light, the hue of blue color appears to be strong to the user and the whiteness of the sheet is enhanced. However, a reading section provided for calibration or the like generally uses a light source which emits visible light only. When only the visible light is emitted, fluorescence is not released from the fluorescent whitening agent. Since the read signal does not include the signal component of fluorescence, the color reproduced by the read signal has a less blue hue compared to the color observed by the user. Thus, the color reproduced by the read signal is not consistent with the color observed by the user.

Conventionally, whether or not the image color is a fluorescent color has been determined from the read signal value of the image, and if the image color is the fluorescent color, color correction for fluorescent color has been performed with respect to the signal value (for example, see Japanese Examined Patent Application Publication No. H6-83364).

However, though the fluorescent color can be determined from the read signal value of the image, it is not possible to determine how much the blue hue will be changed by the fluorescence. The color correction has been always performed with a same correction condition though the change amount of hue varies. Thus, the color after correction has not always been consistent with the color actually observed.

SUMMARY OF THE INVENTION

An object of the present invention is to obtain a read signal having a high reproducibility of color.

In order to achieve the above object, according to one aspect of the present invention, there is provided an image forming apparatus, including: a first reading section which emits visible light to a sheet having an image formed thereon, receives light from the sheet and outputs a read signal having an intensity corresponding to an amount of the received light; a second reading section which emits light including at least ultraviolet light to a ground region of the sheet, receives light from the sheet and outputs a read signal having an intensity corresponding to an amount of the received light; and a correction section which corrects the read signal output from the first reading section by using the read signal output from the second reading section so that a color reproduced by the read signal output from the first reading section is consistent with a color observed by a user.

According to another aspect of the present invention, there is provided a method for correcting a read signal, including: (a) emitting visible light to a sheet which has an image formed thereon, receiving light from the sheet and outputting a read signal which has an intensity corresponding to an amount of the received light with a first reading section; (b) emitting light including at least ultraviolet light to a ground region of the sheet, receiving light from the sheet and outputting a read signal which has an intensity corresponding to an amount of the received light with a second reading section; and (c) correcting the read signal output from the first reading section by using the read signal output from the second reading section so that a color reproduced by the read signal output from the first reading section is consistent with a color observed by a user.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

Hereinafter, an embodiment of an image forming apparatus and a method for correcting a read signal of the present invention will be described with reference to the drawings.

Figure 1:
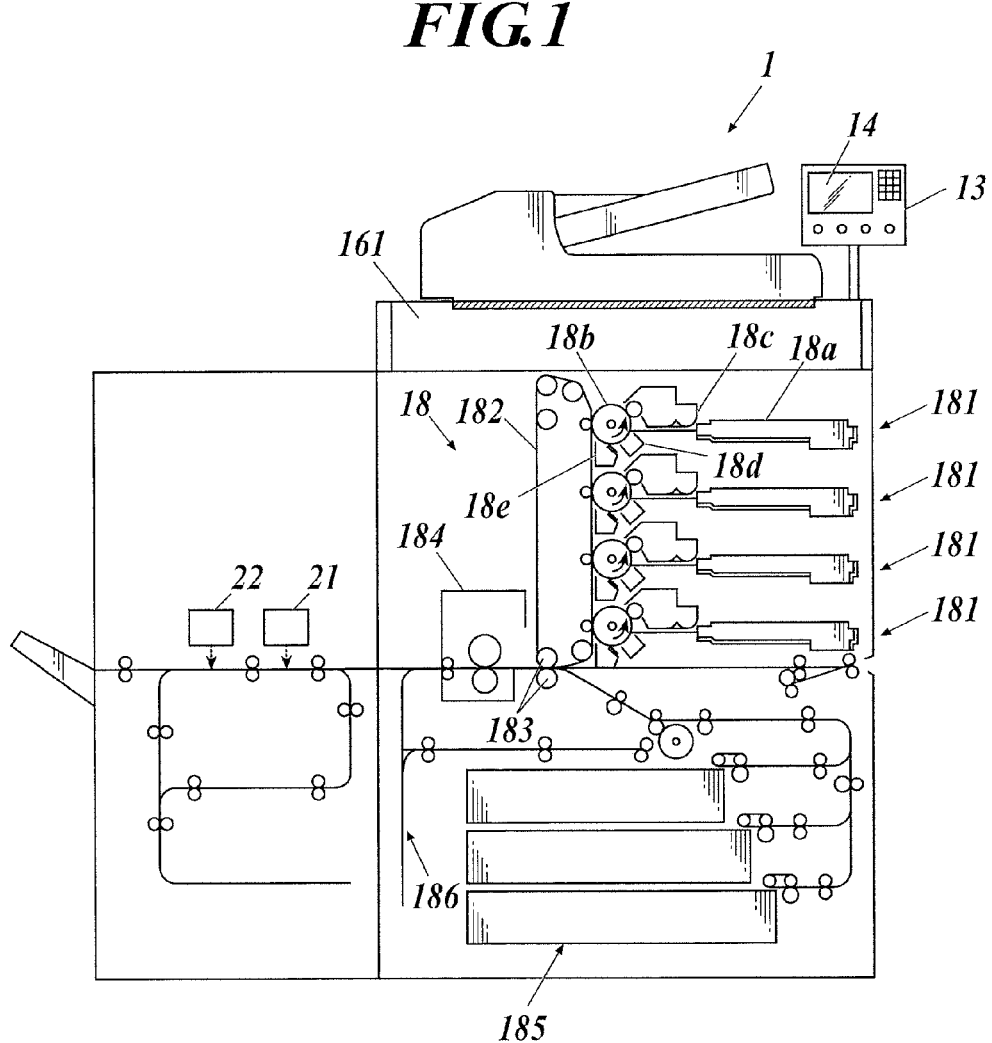
FIG. 1 is a view showing schematic configuration of an image forming apparatus according to an embodiment.

FIG. 1 is a schematic configuration of an image forming apparatus 1 in the embodiment.

As shown in FIG. 1, the image forming apparatus 1 includes an image formation section 18 which forms an image on a sheet of paper, and a first reading section 21 and a second reading section 22 which can read a part of or the entire sheet on which an image was formed by the image formation section 18.

Figure 2:
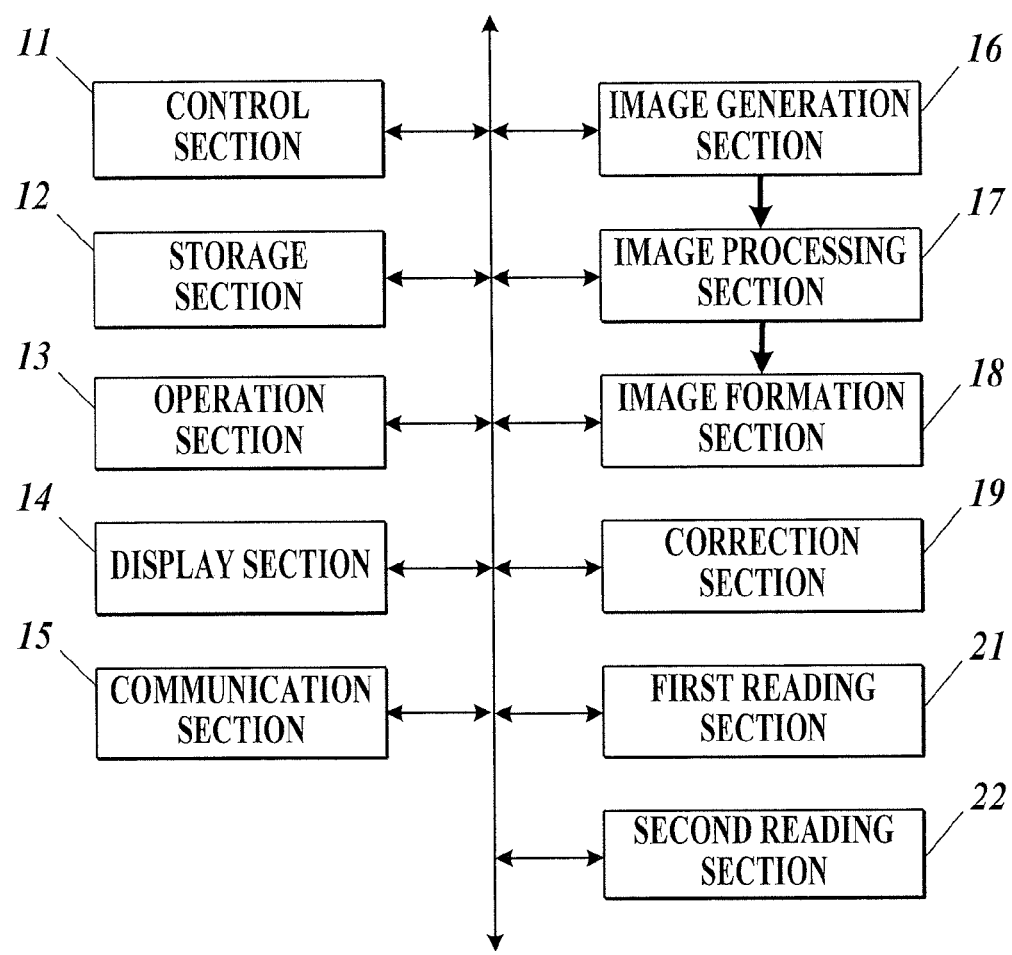
FIG. 2 is a block diagram showing the configuration of the image forming apparatus in FIG. 1 by functions.

FIG. 2 is a block diagram showing the main configuration of the image forming apparatus 1 by the function.

As shown in FIG. 2, the image forming apparatus 1 is configured by including a control section 11, a storage section 12, an operation section 13, a display section 14, a communication section 15, an image generation section 16, an image processing section 17, an image formation section 18, a correction section 19, the first reading section 21 and the second reading section 22.

The control section 11 controls the sections of the image forming apparatus 1 by reading out a program stored in the storage section 12 and executing the program. The control section 11 can be formed of a CPU (Central Processing Unit), a RAM (Random Access Memory) and such like.

For example, the control section 11 controls the image processing section 17 to perform image processing of a bitmap form original image which is generated by the image generation section 16, and controls the image formation section 18 to form an image on a sheet according to tone values of respective pixels after the image processing.

The control section 11 can perform color calibration of the image to be formed by the image formation section 18. At the calibration, the control section 11 makes the image formation section 18 form a reference image for calibration on a sheet, and makes the first reading section 21 read the reference image formed on the sheet. The reference image is formed of a plurality of patches having tone gradations of simple colors that are C (cyan), M (magenta), Y (yellow) and K (black), mixed colors of R (red), G (green) and B (blue) and such like. The control section 11 updates a color correction table to be used by the image processing section 17 according to the difference between an intensity of a read signal and its target value for each of the patches, the read signal being output from the first reading section 21 and corrected by the correction section 19.

The control section 11 can also perform a test for detecting a defect of the image formed by the image formation section 18. At the test, the control section 11 makes the first reading section 21 read the entire sheet on which the image was formed by the image formation section 18. The control section 11 generates an image for comparison by using the read signal output from the first reading section 21 and detects the defects such as a stain, error and loss of an image according to the difference between the image for comparison and the original image generated by the image generation section 16.

The storage section 12 stores programs which are readable by the control section 11 and files which are used when the programs are executed, for example.

As the storage section 12, a large-capacity memory such as a hard disk can be used.

The operation section 13 and the display section 14 are provided as a user interface as shown in FIG. 1.

The operation section 13 generates an operation signal according to user's operation, and outputs the operation signal to the control section 11. As the operation section 13, keys and a touch panel integrally formed with the display section 14 can be used, for example.

The display section 14 displays an operation screen or the like in accordance with the instruction of the control section 11. As the display section 14, an LCD (Liquid Crystal Display), an OELD (Organic ElectroLuminescence Display) and such like can be used.

The communication section 15 communicates with an external apparatus on network such as a user terminal, server and other image forming apparatuses.

For example, the communication section 15 receives data (hereinafter, called PDL data) which is described in page description language (PDL) via a network from a user terminal.

The image generation section 16 rasterizes the PDL data received by the communication section 15, and generates, in each color of C, M, Y and K, an original image in bitmap format having tone values for respective pixels. The tone value is a data value representing a shading of image. For example, the data value of 8 bit represents the shading of 0 to 255 tones.

As shown in FIG. 1, the image forming apparatus 1 includes an image reading section 161 for copying, and can generate an original image in each color of R, G and B by reading, with the image reading section 161, an image of a document which was set by the user.

The image processing section 17 performs image processing such as color correction and halftone processing to the original image generated by the image generation section 16. The image processing section 17 can also generate an original image in each color of C, M, Y and K by color conversion of the original image in R, G and B generated by the image reading section 161.

The color correction is processing for converting tone values of the colors C, M, Y and K into tone values of respective colors C, M, Y and K which were corrected so that the colors of an image formed on the sheet are consistent with the respective target colors. The color correction is performed by using a color correction table which determines tone values after correction corresponding to the tone values before correction.

The halftone processing is screen processing using error diffusing method and systematic dithering method, for example.

The image formation section 18 forms an image including a plurality of colors on a sheet according to tone values of respective pixels in the original image to which image processing was performed by the image processing section 17.

As shown in FIG. 1, the image formation section 18 includes four writing units 181, an intermediate transfer belt 182, secondary transfer rollers 183, a fixing device 184, a paper feeding tray 185 and a reversing mechanism 186. The writing units 181 are located in series along the belt surface of the intermediate transfer belt 182. The intermediate transfer belt 182 is rotated by the plurality of rotating rollers. One of the rollers forms the secondary transfer rollers 183. The secondary transfer rollers 183 and the fixing device 184 are located on the conveyance path of the sheet conveyed from the paper feeding tray 185. The paper feeding tray 185 contains sheets.

The four writing units 181 respectively form images of colors that are C, M, Y and K. Each of the writing units 181 has a same configuration and includes an exposure section 18a, a photoreceptor 18b, a developing section 18c, a charging section 18d and a cleaning section 18e.

Each of the writing units 181 charges the photoreceptor 18b with the charging section 18d, and thereafter exposes the photoreceptor 18b by emitting laser beam with the exposure section 18a according to the tone values of pixels in the image of each C, M, Y and K. Each of the writing units 181 supplies color material such as toner with the developing section 18c to develop an electrostatic latent image formed on the photoreceptor 18b, and then an image in each color is formed on the photoreceptor 18b of each of the writing units 181.

The images on the respective photoreceptors 18b are transferred onto the intermediate transfer belt 182 in order, and an image having a plurality of colors is formed on the intermediate transfer belt 182. After the image transferring, each of the writing units 181 removes the color material remaining on the photoreceptor 18*b* with the cleaning section 18*e*.

When a sheet is supplied from the paper feeding tray 185 and the image having the plurality of colors on the intermediate transfer belt 182 is transferred onto the sheet with the secondary transfer rollers 183, the fixing device 184 heats and presses the sheet to fix the image to the sheet. In a case of forming an image on each side of the sheet, the sheet surface is reversed by the reversing mechanism 186 and conveyed to the secondary transfer rollers 183 again.

When a part of or entire sheet having the image formed thereon is read by the first reading section 21 and the second reading section 22, the correction section 19 uses the read signal output from the second reading section 22 to correct the read signal output from the first reading section 21 so that the color reproduced by the read signal output from the first reading section 21 is consistent with the color observed by the user.

The first reading section 21 includes alight source which emits visible light and a light receiving element which outputs a read signal of intensity corresponding to the amount of light received. The visible light is light having a wavelength of approximately 380 to 780 nm.

As the first reading section 21, a tristimulus value direct reading type which outputs a read signal of each of the colors R, G and B can be used. An optical sensor can be used when the reading range may be a spot, and a line sensor, area sensor and such like can be used when a wider reading range is necessary.

The second reading section 22 includes a light source which emits light including at least ultraviolet light, and a light receiving element which outputs a read signal of intensity corresponding to the amount of light received. The ultraviolet light is light having a wavelength of approximately 200 to 400 nm. If the light includes at least ultraviolet light, the light emitted by the second reading section 22 can also include visible light. Since the standard light source D50 defined by CIE (International Commission on Illumination) includes ultraviolet light, the D50 can be used as the light source of second reading section 22.

The second reading section 22 may include a diffraction grating which disperses the received light into a plurality of wavelengths and a plurality of light receiving elements which outputs read signals of intensities corresponding to the amounts of received light of respective wavelengths, and the second reading section 22 may output the read signals of respective wavelengths.

As the second reading section 22, similarly to the first reading section 21, a tristimulus value direct reading type which outputs read signals of respective colors of R, G and B can be used. In a case of outputting read signals of respective wavelengths, a spectrocolorimeter and such like can be used.

The reading range of second reading section 22 is not especially limited, and may be a spot, line or area.

Figure 3:
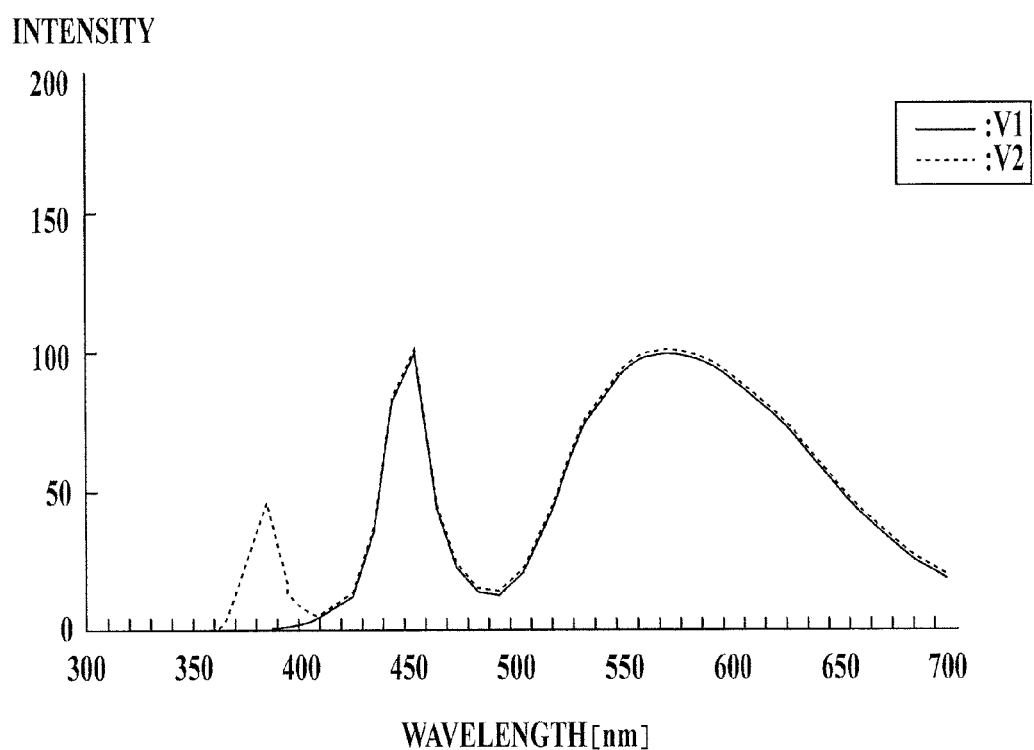
FIG. 3 is a graph showing power spectrums of light emitted from respective light sources of a first reading section and a second reading section.

FIG. 3 shows power spectrums of lights V1 and V2 emitted from respective light sources of first reading section 21 and second reading section 22.

As shown in FIG. 3, the light V1 of first reading section 21 is light of visible range having the wavelength of approximately 380 to 780 nm. On the other hand, the light V2 of second reading section 22 also includes light of ultraviolet range having the wavelength of 400 nm or less in addition to the light of the same visible range as the light V1.

Figure 4:
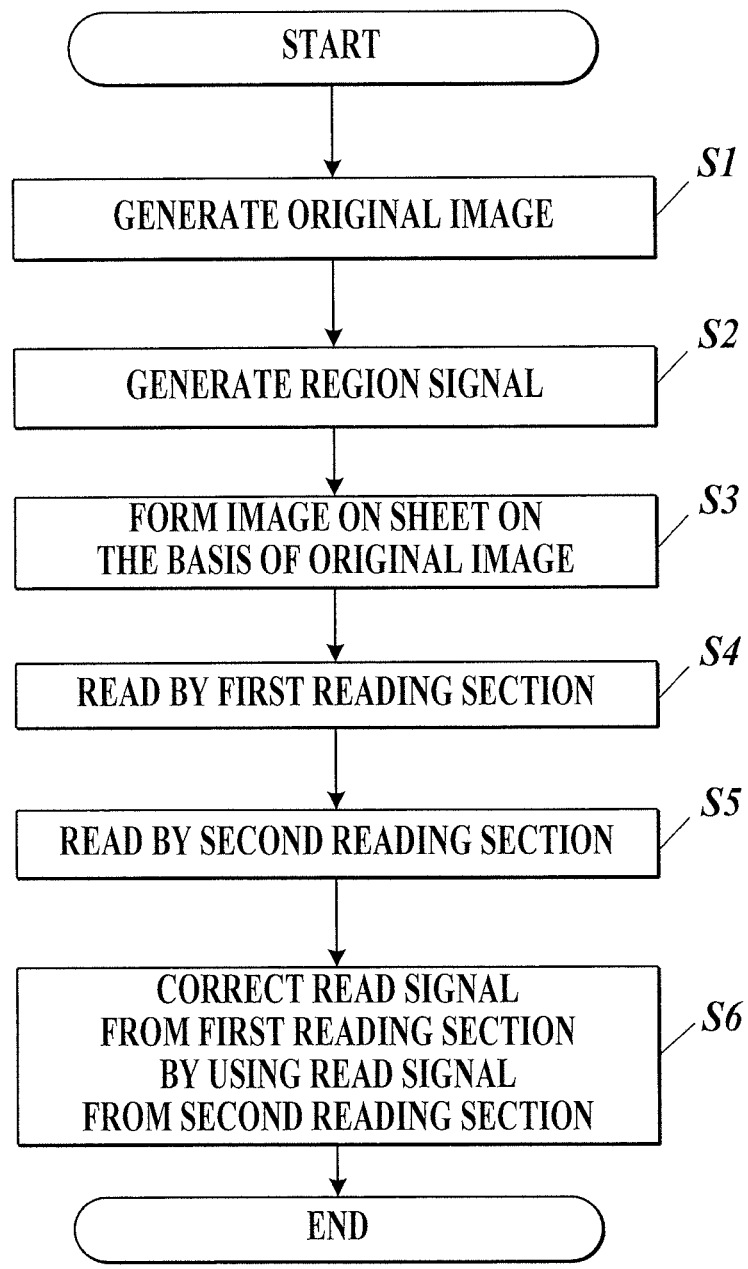
FIG. 4 is a flow chart showing a processing procedure when the image forming apparatus forms an image on a sheet and reads a part of or the entire sheet.

FIG. 4 is a processing procedure when the image forming apparatus 1 forms an image on a sheet and reads a part of or the entire sheet.

When the image forming apparatus 1 receives PDL data, as shown in FIG. 4, the image generation section 16 executes rasterizing of the PDL data and generates an original image of bitmap format (step S1).

The image generation section 16 also generates a region signal indicating a ground region of sheet by using the generated original image (step S2). The region signal generated by the image generation section 16 is output to the second reading section 22.

Figure 5:
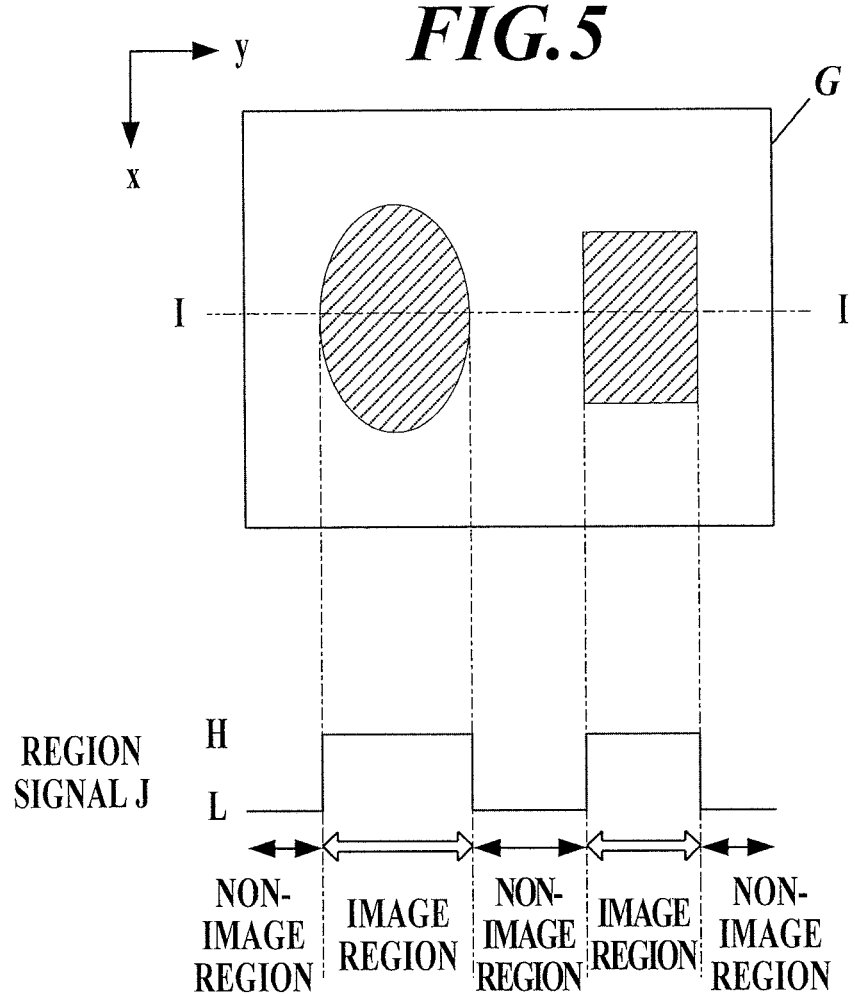
FIG. 5 is a view showing an example of region signal generated by using an original image.

FIG. 5 illustrates the region signal J which is generated by using the original image G.

As shown in FIG. 5, the region signal J is formed of one line image signal in sub-scanning direction y shown by the line I-I in the original image G. In the region signal J, the H level indicates an image region such as character, figure and photograph, and L level indicates a non-image region, that is, a ground region. The position of I-I line in the main scanning direction x can be an arbitrary position as long as it is located within the reading range of the second reading section 22.

In a case where the reading ranges of first reading section 21 and second reading section 22 overlap each other, the region signal can also be generated by using the read signal output from the first reading section 21.

The signal intensity of the read signal output from the first reading section 21 varies largely between the image region such as character and the non-image region similarly to the original image. Thus, the region signal similar to the signal generated from the original image can be generated by extracting the read signal corresponding to the reading position of second reading section 22 in the main scanning direction x among the read signals output from the first reading section 21.

The region signal may be generated by the control section 11, not by the image generation section 16. The region signal can also be generated by using the original image generated by the image reading section 161, not by the original image generated by the image generation section 16.

The second reading section 22 may be located on a non-image region such as a blank space and read the non-image region as the ground region. In such case where the ground region can be always read, the region signal is not necessary.

The image processing section 17 performs image processing such as halftone processing as needed to the original image generated by the image generation section 16. The image formation section 18 forms an image on the sheet according to tone values of respective pixels in the original image which was processed by the image processing section 17 (step S3).

The first reading section 21 reads a part of or the entire sheet conveyed from the image formation section 18. When reading the sheet, the first reading section 21 emits visible light to the sheet, receives light from the sheet and outputs a read signal of the intensity corresponding to the amount of received light (step S4).

The second reading section 22 reads the ground region of sheet. When reading the sheet, the second reading section 22 emits light including at least ultraviolet light to the ground region of the sheet, receives light from the sheet and outputs a read signal of intensity corresponding to the amount of received light (step S5).

The second reading section 22 can determine the ground region of sheet on the basis of the region signal by obtaining the above-mentioned region signal.

As shown in FIG. 5, the region signal J generated by the image generation section 16 indicates the image region and the non-image region. Thus, the second reading section 22 can determine the non-image region indicated by the region signal J as the ground region.

By using the read signal output from the second reading section 22, the correction section 19 corrects the read signal output from the first reading section 21 so that the color reproduced by the read signal output from the first reading section 21 is consistent with the color observed by the user (step S6).

The fluorescent whitening agent in the sheet absorbs ultraviolet light having the wavelength ranged approximately 300 to 400 nm, and releases the light (fluorescence). Since the fluorescence is in the visible region having the wavelength of approximately 400 to 450 nm, the blue hue is observed to be strong when the user observes the sheet in natural light including ultraviolet light. However, since the first reading section 21 emits only the visible light, light is not released from the fluorescent whitening agent. The color reproduced by the read signal output from the first reading section 21 has a less blue hue compared to the color which is actually observed by the user, and the colors are not consistent with each other.

On the other hand, since the second reading section 22 emits at least ultraviolet light when reading the sheet, the second reading section 22 can observe the fluorescence released from the fluorescent whitening agent and output the fluorescence as the read signal. The correction section 19 uses the read signal output from the second reading section 22 to correct the intensity of read signal from the first reading section 21 so that the signal component of blue hue increased by the fluorescence whitening agent is added to the read signal output from the first reading section 21.

As described above, since the sheet which contains fluorescent whitening agent absorbs ultraviolet light and releases fluorescence, a less amount of ultraviolet light is reflected on the sheet surface and observed by the second reading section 22 than the amount of light in a case of sheet not containing the fluorescent whitening agent. As the ultraviolet light is absorbed more, the fluorescence is released more and the blue hue is increased. Thus, the color reproduced by the read signal can be consistent with the apparent color by performing correction in accordance with the amount of absorbed ultraviolet light or the amount of fluorescence and increasing the signal intensity of blue color among read signals of respective colors R, G and B output from the first reading section 21.

When performing correction in accordance with the amount of absorbed ultraviolet light, the correction section 19 uses read signals of respective wavelengths which are output by dispersing the light received by the second reading section 22 into a plurality of wavelengths. Specifically, the correction section 19 sums the intensities of read signals having wavelengths within the ultraviolet region, for example, 200 to 400 nm among the read signals output from the second reading section 22. The correction section 19 then calculates, as the intensity corresponding to the amount of absorbed ultraviolet light, the difference obtained by subtracting the summed intensity from the reference intensity. The reference intensity is a total of intensities of read signals having the wavelengths ranged within the ultraviolet region among the read signals obtained by emitting ultraviolet light to the sheet not containing the fluorescent whitening agent with the second reading section 22.

Next, the correction section 19 determines a correction factor according to the difference between the reference intensity and the intensity of read signal. The correction factor is a factor for increasing the signal intensity of blue color so that the color reproduced by the corrected read signal is consistent with the color observed by the user in natural light.

Figure 6:
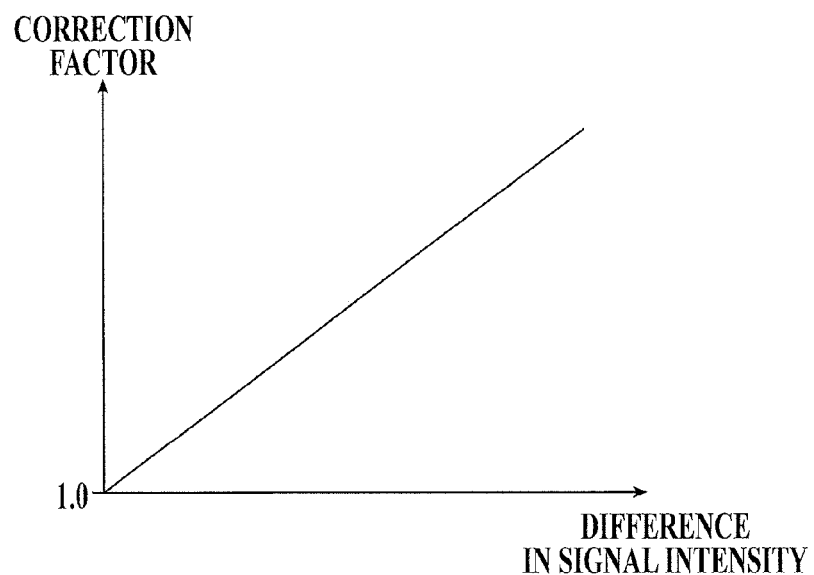
FIG. 6 is a graph showing a correction factor corresponding to the difference in intensity between an intensity of the read signal output from the second reading section and a reference intensity.

FIG. 6 shows an example of the determined correction factor. As shown in FIG. 6, the correction factor is determined to be a larger value as there is a larger difference between the reference intensity and the intensity of read signal having wavelength ranged within the ultraviolet region output from the second reading section 22.

The correction section 19 corrects the signal intensity of blue color by multiplying together the determined correction factor and the read signal of blue color among read signals of R, G and B output from the first reading section 21.

On the other hand, in a case where correction is performed according to the amount of fluorescent light, the correction section 19 calculates the difference in intensity between the read signal output from the second reading section 22 and the read signal output from the first reading section 21. In a case where the read signal is output for each wavelength from the second reading section 22 and not in the color system as that of the first reading section 21, tristimulus values X, Y and Z are obtained from the read signals of the wavelengths and converted into read signals of respective colors of R, G and B. Since the read signal output from the first reading section 21 is a read signal in which the fluorescence is not observed, the correction section 19 calculates, as the intensity corresponding to the amount of fluorescent light, the difference obtained by subtracting the read signal of first reading section 21 from the read signal of second reading section 22 which was obtained by the conversion.

Next, the correction section 19 determines the correction factor according to the difference between the read signal of second reading section 22 and the read signal of first reading section 21. Since the blue hue is larger as the amount of fluorescent light is larger, the correction section 19 can determine the correction factor to be a larger value as the difference between the read signal of second reading section 22 and the read signal of first reading section 21 is larger similarly to the correction factor shown in FIG. 6.

The correction section 19 corrects the intensity of blue color signal by multiplying together the determined correction factor and the read signal of blue color among read signals of R, G and B output from the first reading section 21.

The correction section 19 includes a table which determines, in advance, the correlation between the difference in signal intensity and the correction factor as shown in FIG. 6. The correction section 19 can obtain the correction factor corresponding to the difference in signal intensity from the table.

According to the type of sheets, the type or amount of fluorescent whitening agent varies and the amount of fluorescence released from the fluorescent whitening agent varies in some cases. Thus, it is preferable that the correction section 19 includes a table determining the correlation between the difference in signal intensity and the correction factor for each type of sheets and determines the correction factor by switching the table according to the type of sheets.

It is preferable that the correction section 19 determines the correction factor by switching the table every time the type of sheets used for the image formation is changed, for example, every time the job is switched or the setting of paper feeding tray is changed. Thereby, even in a case where the change amount of blue hue varies according to the type of sheets, the read signal output from the first reading section 21 can be corrected so as to reproduce the color observed by the user.

When the intensity of read signal after correction exceeds the maximum value of intensity, the correction section 19 changes the intensity of read signal after correction to an intensity which is equal to or lower than the maximum value. The correction section 19 may change only the intensity of read signal exceeding the maximum value to be equal to or lower than the maximum value, or may change all the intensities of read signals to be lowered by a certain intensity.

Though the embodiment illustrates the correction factor which is multiplied to obtain the signal intensity after correction, there may be used a correction factor which is added to obtain the blue signal intensity after correction.

In order to enhance the correction accuracy, correction may be performed by using a read signal obtained by reading different positions of ground region with the second reading section 22 a plurality of times and averaging the read signals.

Figure 7:
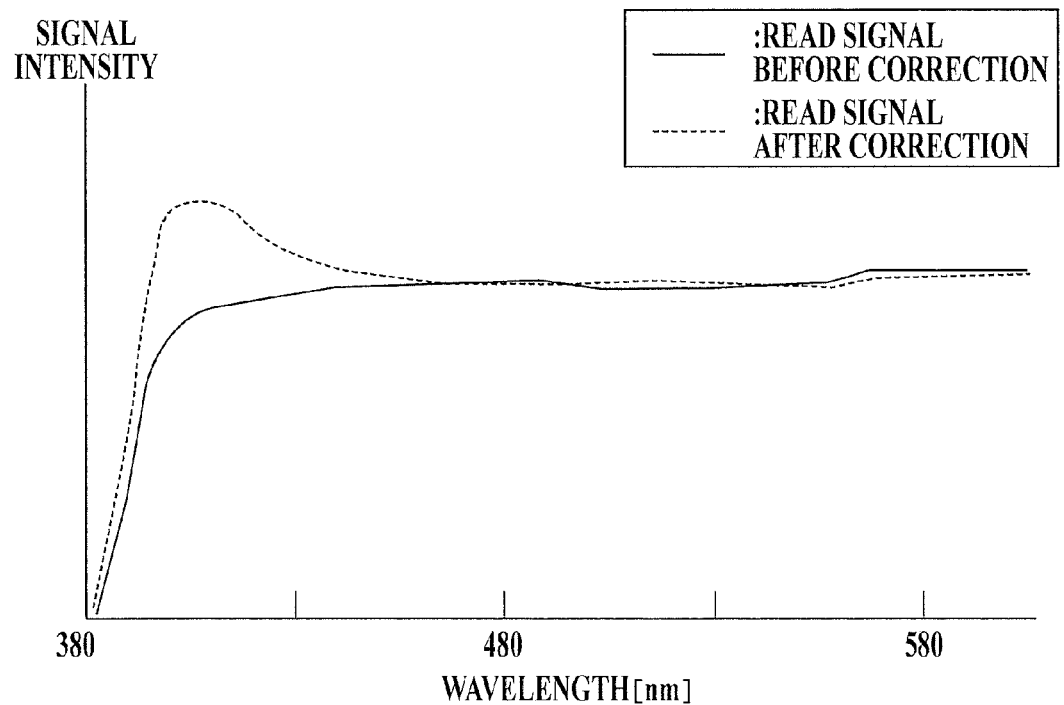
FIG. 7 is a graph showing respective power spectrums of read signals before and after correction.

FIG. 7 shows power spectrums of respective read signals before and after correction.

As shown in FIG. 7, the signal component of blue hue observed by fluorescence released from the fluorescent whitening agent is added to the read signal output from the first reading section 21 by the correction, and the signal intensity of approximately 380 to 450 nm is increased. Thus, the color reproduced by read signal from the first reading section 21 can be consistent with the color actually observed by the user.

As described above, the image forming apparatus 1 in the embodiment includes the first reading section 21 which emits visible light to the sheet having an image formed thereon, receives light from the sheet and outputs a read signal having an intensity corresponding to the amount of received light; a second reading section 22 which emits light including at least ultraviolet light to the ground region of sheet, receives light from the sheet and outputs a read signal having an intensity corresponding to the amount of received light; and a correction section 19 which corrects the read signal output from the first reading section 21 according to the intensity of read signal output from the second reading section 22 so that the color reproduced by the read signal output from the first reading section 21 is consistent with the color observed by the user.

Thus, it is possible to obtain a read signal in which a signal component of fluorescence released from the fluorescent whitening agent in the sheet is added to the read signal obtained by emitting only visible light, and it is possible to make the color reproduced by the read signal be close to or consistent with the color observed by the user. Accordingly, it is possible to obtain a read signal having a high reproducibility of color.

The above embodiment is a preferred example of the present invention, and the present invention is not limited to this. Changes can be appropriately made within the scope of the present invention.

The embodiment uses a fluorescent whitening agent which increases the blue hue in order to enhance the whiteness of sheet; however, the present invention can also be applied to a case of using a fluorescent whitening agent which increases a hue of other colors such as red and yellow in order to color the ground.

For example, in a case of using a fluorescent whitening agent which increases the red hue, the read signal of red color of the first reading section 21 is corrected.

The processing procedure of correction section 19 can also be executed by the control section 11 reading a program. Instead of the image forming apparatus 1, the processing procedure of correction section 19 can also be executed by a computer such as general-purpose PC reading the program. As a computer readable medium of the program, a non-volatile memory such as a ROM and a flash memory and a portable recording medium such as a CD-ROM can be applied. The carrier wave can also be applied as a medium providing program data via a communication line.

The entire disclosure of Japanese Patent Application No. 2014-236085 filed on Nov. 21, 2014 including description, claims, drawings, and abstract are incorporated herein by reference in its entirety.

What is claimed is:

1. An image forming apparatus, comprising:
   an image forming section which forms an original image on a sheet which contains a fluorescent whitening agent;
   a first reading section which emits visible light to the sheet, receives light from the sheet and outputs a read signal having an intensity corresponding to an amount of the received light;
   a second reading section which emits light including at least ultraviolet light to a ground region of the sheet, receives light from the sheet and outputs a read signal having an intensity corresponding to an amount of the received light; and
   a correction section which corrects the intensity of the read signal output from the first reading section by using the read signal output from the second reading section so that the intensity of the read signal output from the first reading section is corrected according to a difference between the intensity of the read signal output from the second reading section and the intensity of the read signal output from the first reading section thereby accounting for an influence of the fluorescent whitening agent.

2. The image forming apparatus of claim 1, wherein
   the second reading section obtains a region signal indicating the ground region of the sheet and determines the ground region of the sheet on the basis of the obtained region signal, and
   the region signal is generated by using the original image.

3. The image forming apparatus of claim 1, wherein
   the second reading section obtains a region signal indicating the ground region of the sheet and determines the ground region of the sheet on the basis of the obtained region signal, and
   the region signal is generated by using the read signal output from the first reading section.

4. The image forming apparatus of claim 1, wherein
   the first reading section outputs read signals of respective colors of red, green and blue, and
   the correction section corrects a read signal of blue output from the first reading section.

5. The image forming apparatus of claim 1, wherein
   the second reading section disperses the received light into a plurality of wavelengths and outputs read signals which have intensities corresponding to amounts of the received light for the respective wavelengths, and the correction section determines a correction factor according to a difference between a reference intensity and an intensity of a read signal having a wavelength within an ultraviolet region among the read signals of the respective wavelengths output from the second reading section, and the correction section corrects the read signal output from the first reading section by using the determined correction factor.

6. The image forming apparatus of claim 1, wherein the correction section determines a correction factor according to a difference between the intensity of the read signal output from the second reading section and the intensity of the read signal output from the first reading section, and corrects the read signal output from the first reading section by using the determined correction factor.

7. The image forming apparatus of claim 5, wherein the correction section determines the correction factor each time a type of the sheet used for image formation is changed.

8. The image forming apparatus of claim 1, wherein the original image is generated from page description language (PDL) data.

9. The image forming apparatus of claim 1, wherein the image forming apparatus further comprises:
 a control section that updates a color correction table according to the difference between an intensity of the corrected read signal and its target value.

10. The image forming apparatus of claim 9, wherein the image forming apparatus further comprises:
 an image processing section that performs a color correction on the basis of the updated color correction table.

11. The image forming apparatus of claim 1, wherein the ground region of the sheet is a blank region.

12. The image forming apparatus of claim 1, wherein the second reading section reads light only from a blank region.

13. The image forming apparatus of claim 1, wherein the image forming section forms the original image by colorant which contains no fluorescent material.

14. A method for correcting a read signal, comprising:
(a) forming an original image on a sheet which contains a fluorescent whitening agent;
(b) emitting visible light to the sheet, receiving light from the sheet and outputting a read signal which has an intensity corresponding to an amount of the received light with a first reading section;
(c) emitting light including at least ultraviolet light to a ground region of the sheet, receiving light from the sheet and outputting a read signal which has an intensity corresponding to an amount of the received light with a second reading section; and
(d) correcting the intensity of the read signal output from the first reading section by using the read signal output from the second reading section so that the intensity of the read signal output from the first reading section is corrected according to a difference between the intensity of the read signal output from the second reading section and the intensity of the read signal output from the first reading section thereby accounting for an influence of the fluorescent whitening agent.

15. A method for calibrating a color image, comprising:
(a) emitting visible light to a sheet which has an image formed thereon, receiving light from the sheet and outputting a corrected read signal from the first reading section according to claim 14; and
(b) updating a color correction table according to a difference between the corrected read signal and data for the original image.

16. The method of claim 15, wherein the original image is a reference image comprising a plurality of color patches.

17. The method of claim 15, wherein the first reading section and the second reading section emit visible light to the sheet and an image area of the sheet contains no fluorescent material.

* * * * *